United States Patent [19]

Poppelreiter, II

[11] 4,031,442

[45] June 21, 1977

[54] ELECTRONIC POSITION AND VELOCITY CONTROL SYSTEM

[75] Inventor: Joseph C. Poppelreiter, II, Sterling Heights, Mich.

[73] Assignee: Kubik Hydradrives, Inc., Troy, Mich.

[22] Filed: May 12, 1975

[21] Appl. No.: 576,743

Related U.S. Application Data

[63] Continuation of Ser. No. 423,805, Dec. 11, 1973, abandoned.

[52] U.S. Cl. .............................. 318/561; 318/663; 187/29 R
[51] Int. Cl.² ...................................... G05B 13/00
[58] Field of Search .............. 318/561, 663; 187/29

[56] References Cited

UNITED STATES PATENTS

| | | | |
|---|---|---|---|
| 3,209,338 | 9/1965 | Romvari | 318/561 X |
| 3,412,300 | 11/1968 | Westenskow | 318/561 |
| 3,612,220 | 10/1971 | Hall | 187/29 |
| 3,809,986 | 2/1973 | Visser | 318/561 |
| 3,818,300 | 6/1974 | Stroman | 318/561 |

*Primary Examiner*—B. Dobeck
*Attorney, Agent, or Firm*—Andrew R. Basile

[57] ABSTRACT

An electronic system for controlling the extent of motion and starting and stopping positions of a hydraulically driven member is described. The driven member is equipped with voltage sensitive means which provides a voltage indicative of the position of the driven member along the path of motion. The position indicative voltage is compared with reference voltages and the resulting comparison voltages actuate switching circuitry to effect changes in the travel speed of the driven member and to control the start and stop positions of the driven member. Hydraulic or mechanical apparatus responsive to the switching circuitry controls the motion extent and velocity of the driven member in accordance with the comparison voltages. The inventive control system thus provides accurate positioning and selected velocity changes along the path of motion of a member driven by a hydraulic source.

1 Claim, 4 Drawing Figures

ELECTRONIC POSITION AND VELOCITY CONTROL SYSTEM

BACKGROUND OF THE INVENTION

This is a continuation of co-pending U.S. Pat. Application Ser. No. 423,805, filed Dec. 11, 1975 now abandoned.

In many industrial applications there is a need for accurately controlling the travel extent and velocity of a member driven along a predefined path. Industrial usages requiring such operation include virtually all operations where a work performing member is driven along a carriage. The work performing member may be called upon to perform a particular function during the travel period such as, for example, the grinding of a rotating piece of work stock by moving the grinder in reciprocating fashion the length of the stock. Alternatively, the work performing member may merely be driven between selected positions along the work piece and a particular function performed by a working tool at each position. This type of operation could include, for example, spot welding or drilling. In either event, there is a need for accurate control of the relative movement between the work piece and the work performing element. Accordingly, it is necessary to start and stop the driven member at precise locations and to decelerate the driven member at appropriate points to assure that the desired stop point is not overshot. For this reason, virtually all prior art systems accelerate the driven element as a selected rate until a maximum velocity of relative motion is attained. The relative velocity then remains constant until a selected location is reached at which time the moving member is decelerated until a minimum velocity is reached. Motion continues at the minimum velocity until the desired stop point is reached. The acceleration phase is used so that the driven element is gradually brought up to speed without undue strain on the system while overcoming the inertia of the driven member. The constant speed phase is selected in accordance with the maximum speed permissible for the particular system and operation to increase efficiency. The deceleration phase is used to gradually stop the driven element to prevent overshoot and thus increase the accuracy of the system.

In the oldest of prior art systems the velocity changes were effected by causing the driven member to physically contact limit switches. The limit switches actuated control circuitry to effect the velocity changes. Thus a limit switch was located at the position where deceleration, for example, was to occur. When the driven member contacted the switch, the deceleration was effected. Because limit switches have limited accuracy and high maintenance cost there have been many attempts to achieve the same control functions while eliminating the limit switches. Typically, systems eliminating limit switches utilize an electric motor and employ a control circuit for changing the speed of the electric motor. Such a system is described in U.S. Pat. No. 3,470,431 where a set of potentiometers establish reference voltages to actuate relays as the reference voltages and a voltage proportional to the motor position compare. The relays change the resistance of a D.C. motor circuit resulting in the desired speed changes of the motor.

Because the system described in the above referred system utilizes a DC electric motor, speed changes can be effected by changing the resistance of the motor circuit. However, in applications utilizing a hydraulic or mechanical drive mechanism other means must be provided for varying the speed of the driven element because speed changes of the hydraulic pump ordinarily cannot be effected simply by switching resistors in and out of the motor circuit. Accordingly, speed changes must be effected by changing the fluid flow from the hydraulic pump to the driven element. The instant element is directed to such a system.

SUMMARY OF THE INVENTION

The environment in which the invention control circuit is employed can be best understood by making reference to FIG. 1. FIG. 1 shows a constant speed electric motor 10 which is energized by an AC or DC supply by way of input leads 11. Electric motor 10 drives a hydraulic pump 12 so that fluid is provided by the pump to a fluid flow varying mechanism 13. Pump 12 can be either constant or variable speed; however, control of the speed of the driven number is obtained from the fluid flow varying mechanism 13. Fluid is supplied from the mechanism 13 to a hydraulic motor 14 by way of input conduits 16 and 17. The hydraulic motor 14 will rotate in one direction, e.g. clockwise, when fluid is supplied over the conduit 16 and the other direction, e.g. counter clockwise, when fluid is supplied by way of conduit 17. The rotation of hydraulic motor 14 rotates a gear member 18 resulting in the linear motion of a belt or chain 19. An idler gear 21 is also associated with the belt or chain 19 to provide for constant linear motion, the direction of which is dependent upon the direction of rotation of gear 18.

Coupled to belt 19 is a load 22 which moves linearly along with the belt 19. The load 22 therefore moves relative to a fixed member 23. In practice load 22 can be a working tool such as a cutting tool or other member, and fixed element 23 can be the stock upon which the work is being performed. Alternatively if desired, load 22 can be the member upon which the work is being performed and the fixed member 23 can be the working tool. In either even the primary function of the inventive system is to control the linear motion of the load 22 from a first position 24 to a second position 26 and then subsequently reverse the motion so that the load 22 will return to position 24. The invention also provided for the deceleration of the velocity of load 22 at a preselected point 27 so that the inertia of the load does not cause overshoot of the stop point 26.

Because electric motor 10 and hydraulic pump 12 sometimes runs at constant speed and because controlling fluid flow to motor 14 by changing the speed of electric motor is too slow because of the response time, control of the direction and velocity of rotation of hydraulic motor 14 is effected by controlling the fluid flow from the fluid varying mechanism 13. This is accomplished in known manner by an element called a swash plate. The swash plate is angularly disposed with respect to the orfices leading to conduits 16 and 17 so that as the angle changes, the volume of fluid flow to the input orfice is varied by the angle of the swash plate. Fluid from motor 14 returns to fluid mechansim 13 by way of the other orfice. Accordingly, the angular disposition of the swash plate determines which of the conduits 16 and 17 serves as the input conduit to thereby control the direction of rotation of hydraulic motor 14. Also because the angular disposition of the swash plate changes the fluid flow to the motor, the speed of the motor 14 is varied simply by varying the angular disposition of the swash plate.

The inventive control system generates a position indicative signals which energize control circuitry. The control circuitry actuates a mechanical mechansim to effect changes of the angular disposition of the swash plate so that the load 22 is controlably moved with respect to the fixed number 23. The relative velocity of the two members is decelerated at a preselected stop point 26. The control system then permits the reversal of motion of the load so that deceleration of the reverse direction motion occurs at a second preselected point 28 and load 22 accurately stops at point 24 where motion in the forward direction begins.

The position indicative signals which control the motion of load 22 are generated by a signal sending unit 29. The signals from sending unit 29 are coupled to a controller 31 by way of cabling 32.

Sending unit 29 includes a potentiometer so that the voltage across the potentiometer is indicative of the position of the load 22 with respect to the four control points 24, 26, 27, and 28. This control voltage is compared with a reference voltage established by a plurality of reference potentiometers 33 to 40. By comparing the voltage across the potentiometer contained within the sending unit 29 with the reference voltage established on the appropriate potentiometer of controller 31 a control signal is generated and supplied to the switching circuitry 41 by way of cable 42. The switching circuitry then changes the angular disposition of the swash plate by way of a mechanical coupling 43. It should be noted the controller 31 is provided with an input cable 44 which is connected to an appropriate AC or DC source to supply the required voltage for establishing the reference voltages on the various potentiometers 33 to 40.

DESCRIPTION OF THE PREFERRED EMBODIMENT

Figure 2:
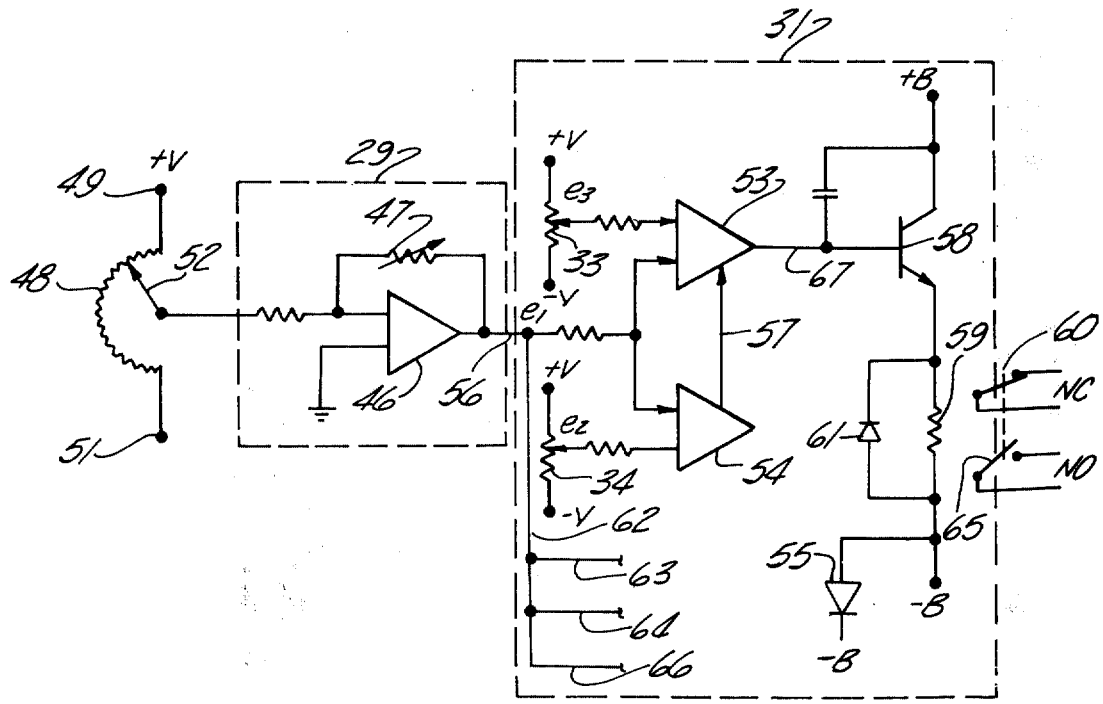
FIG. 2 is a preferred embodiment of the invention.

As shown in FIG. 2, the sending unit 29 includes an operational amplifier 46 having a unity gain. An adjustable bypass resistor 47 is associated with amplifier 46. This combination of elements permits accurate adjustment of the system when initially establishing the start and stop points of the system.

Figure 1:
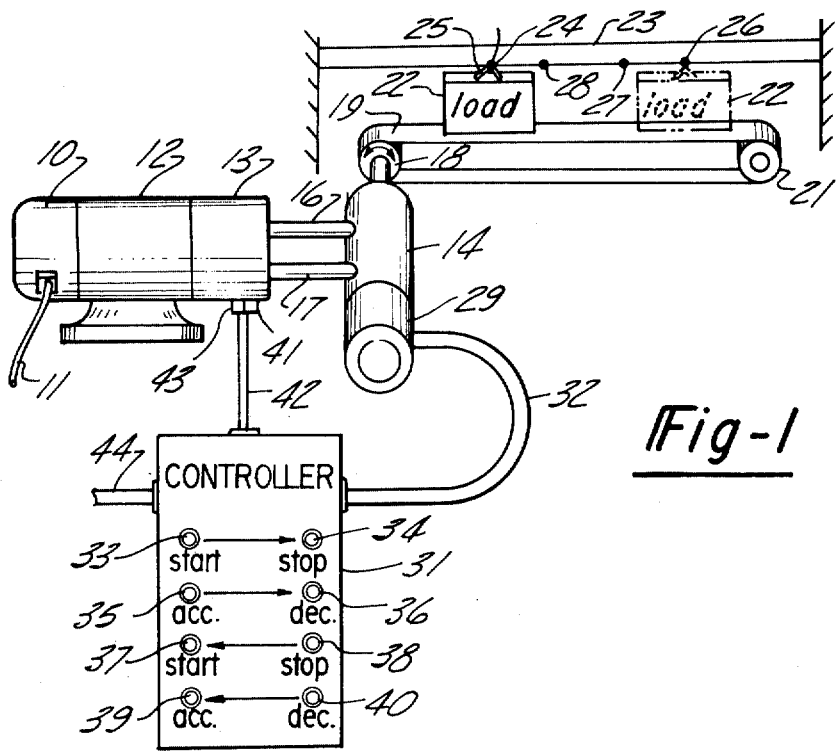
FIG. 1 shows the environment in which the inventive system is employed.

Amplifier 46 receives an input from potentiometer 48. A plus voltage terminal 49 and a minus voltage terminal 51 are respectively connected to opposite ends of potentiometer 48. The plus and minus voltages can be of equal but opposite magnitudes; or, alternatively, the minus voltage can be zero and the plus voltage some preselected positive value. Potentiometer 48 is swept by wiper arm 52 which is mechanically coupled to either gear 18 or hydraulic motor 14. Wiper arm 52 therefore sweeps potentiometer 48 in synchronism with the rotation of gear 18 (FIG. 1). Accordingly, the voltage across potentiometer 48 is indicative of the position of load 22 along the path of travel.

The output of amplifier 46 serves as an input to two operational amplifiers 53 and 54 by way of line 5–6. Amplifier 53 also receives an input from a potentiometer 33 which, as illustrated in FIG. 1, establishes the voltage for start point 24. For this reason, upon initial set up of the system the load 22 is physically positioned at start point 24 and potentiometer 33 is adjusted so that the voltage $e_3$ is equal to the position indicative voltage $e_1$ from potentiometer 48.

Operational amplifier 54 receives a second input from potentiometer 34 which, as illustrated in FIG. 1, established the voltage for stop point 26. Hence, upon initial set up of the system load 22 is physically positioned at stop point 26 and potentiometer 34 adjusted until voltage $e_2$ equals voltage $e_1$ from potentiometer 48. At this point voltage $e_1$ value is different from the value at point 24 because of the movement of arm 52 along potentiometer 48. The point 27 at which deceleration occurs is established by potentiometer 36 of controller 31. Potentiometer 36 is not shown in FIG. 2, however it should be understood that a circuit similar to that shown will include potentiometers 35 and 36 and two amplifiers. This circuit will receive the output $e_1$ of amplifier 46 over line 56. It should be noted that the voltage set onto potentiometer 35 will be a voltage which is available on potentiometer 48 before the voltage indicative of start point 24. The reason for this is explained hereinafter. Operational amplifiers 46, 53, and 54 are standard integrated circuits of the LM 301 type supplied, for example, by National Semiconductor Corporation.

A line 57 connects amplifiers 53 and 54 so that the output of amplifier 53 is changed in accordance with changes in the input $e_1$ in a manner described hereinafter.

The output of amplifier 53 is connected to the base of a transistor 58 over line 67. Accordingly, when the output of amplifier 53 is positive, transistor 58 fires causing current flow through coil 59 thereby opening and closing normally closed and normally open relays 60 and 65 respectively, which are responsive to the magnetic field caused by current flow through the coil. A diode 61 is connected across coil 59 to provide for rapid voltage changes across the coil upon deactuation, that is the diode provides for dv/dt suppression. A light emitting diode 55 is connected in series with coil 59 to provide visual indication when current is flowing through coil 59.

It should be noted that the output line 56 of amplifier 46 is also applied to lines 63, 64, and 66 by way of line 62. Each of lines 63, 64, and 66 would provide an input to a circuit identical to that receiving the input from line 56. Accordingly, each of the pairs of potentiometers shown associated with controller 31 in FIG. 1 provides inputs to a circuit identical to that described herein above. These potentiometers are used to establish the various control points shown in FIG. 3.

The operation of the circuit is such that ordinarily line 67 of amplifier 53 is at − B potential, consequently no current flows through coil 59. When hydraulic motor 14 of FIG. 1 begins rotating, arm 52 moves along potentiometer 48 so that the voltage input to amplifier 46 is indicative of the position of load 22 along the travel path.

Assuming that initially the load 22 will be moved from left to right, the voltage $e_2$ set onto potentiometer 34 will be less than the voltage $e_3$ set onto the potentiometer 33. Also voltage $e_2$ is less than position indicative voltage $e_1$ from potentiometer 48. As the load moves wiper arm 52 moves proportionally thereto thereby increasing voltage $e_1$ which is input to amplifiers 53 and 54. When $e_1$ equals $e_2$ output line 57 of the amplifier 54 becomes positive causing a positive output from amplifier 53 on line 67. The positive voltage on line 67 causes transistor 58 to go conductive and current passes through coil 59 actuating the relay which is responsive to coil 59. Current continues to flow through coil 59 until $e_1$ becomes greater than the voltage $e_3$ intput to amplifier 53. When this occurs, amplifier 53 no longer yields a positive output voltage so that transistor 58 no longer conducts and relay coil 59 is deenergized causing the switch to open. When voltage $e_3$ represents stop point 26 the motion of the motor is stopped. For the other circuits the motor will be decelerated etc.

Figure 3:
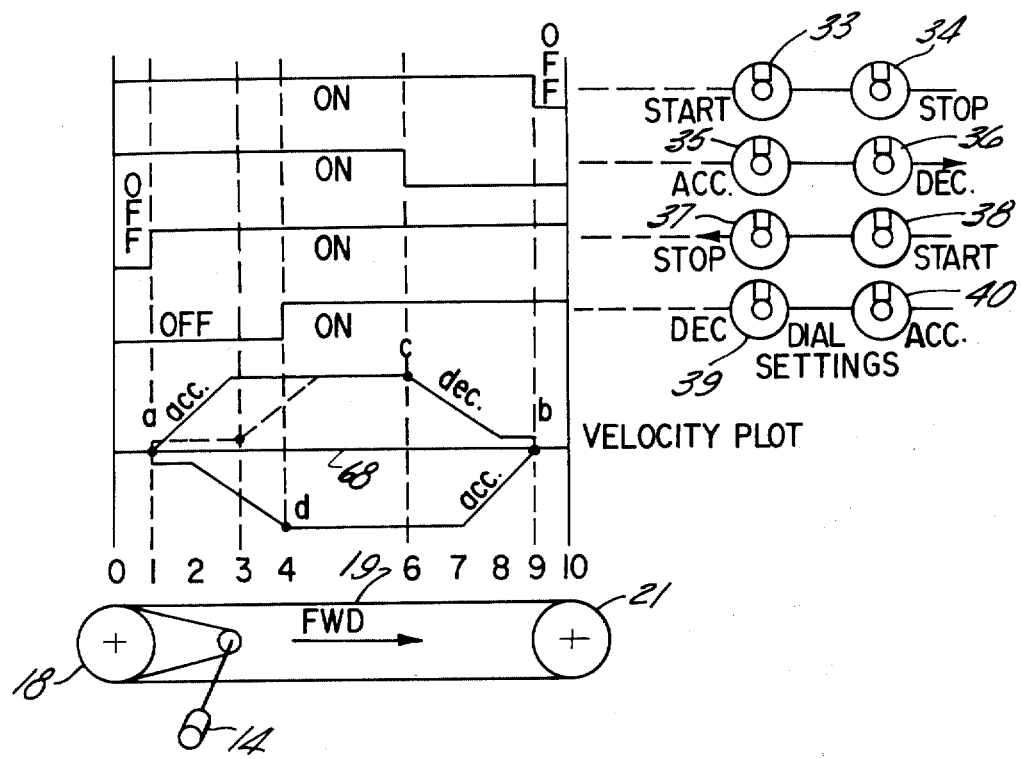
FIG. 3 shows the various motion control points and is useful in understanding the operation of the invention.

A more complete understanding of the motion control of the load can be gained by viewing FIG. 3. This FIGURE, above line 68, shows a graph of the velocity movement from left to right and the acceleration and deceleration points along the motion path. The graph below line 68 shows the motion and the associated control points going from right to left.

For forward motion, that is from left to right, assume that the load is positioned at point a. The load 22 is physically placed at this position and potentiometer 48 yields some voltage $e_1$ indicative of the position. When fluid flow to motor 14 commences, the motor begins accelerating at a rate determined by mechanical operation of the swash plate which controls the fluid flow and hence also controls the speed of hydraulic motor 14. Motor 14 therefore accelerates up to a velocity which is determined by the mechanical settings 43 on fluid flow varying mechanism 13 in a manner known to those skilled in the art. The motor continues running at constant speed until point c is reached. This point is determined by the setting on the potentiometer 36 in the manner described hereinabove. Hence when point c is reached the amplifier corresponding to amplifier 53 causes a transistor corresponding to transistor 58 to conduct and a switch is actuated resulting in mechanical coupling 43 changing the angular position of the swash plate. The velocity of the motor is therefore decelerated until a minimum spped is reached. The deceleration curve and the minimum speed are dependent upon the characteristics of the fluid varying mechanism 13 and are independent of the inventive control system. Upon reaching the minimum speed the velocity continues at that speed until the selected stop point b is reached. This point is determined by the setting on potentiometer 34 so that the load is accurately positioned at the selected point.

For convenience, the velocity diagram in the reverse direction (left to right) is show beneath that for the forward direction. The hydraulic motor is accelerated along the acceleration line in accordance with the characteristics of the hydraulic sytem until point 7 is reached at which time the motor runs at constant speed until point 3 is reached. Point d is determined by the setting on potentiometer 39 and accordingly can be varied at will simply by varying the setting on potentiometer 39. Upon reaching point d the motor is decelerated, in accordance with the characteristics of the hydraulic system, until it reached a minimum constant speed. Motion continues at the minimum speed until point a is reached and the motor is stopped. It should be noted that point a is the start point for motion in the left to right direction.

Figure 4:
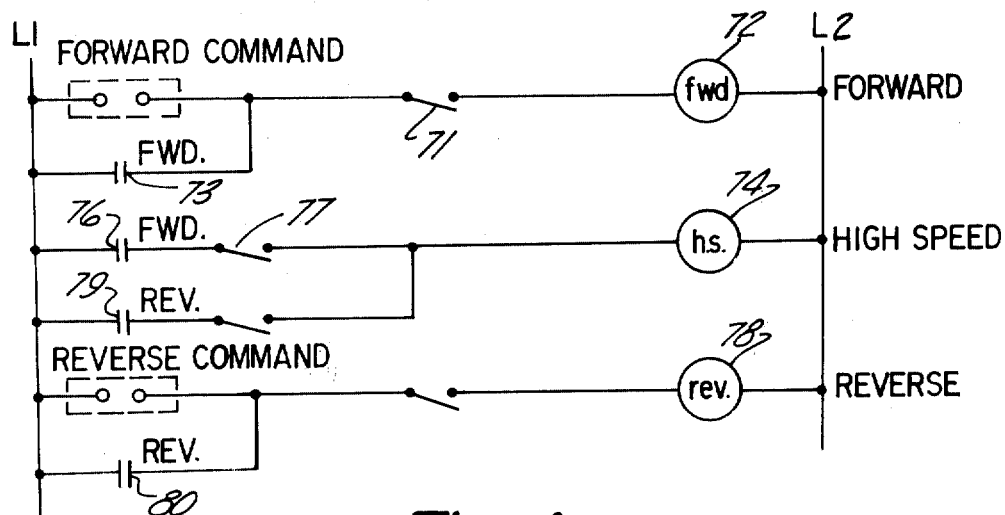
FIG. 4 is an exemplary switching connection which can be used in conjunction with the invention.

The operation of a control circuit which can be used with the inventive system is shown in FIG. 4.

A forward command signal is received which energizes the forward solenoid 72 via the Forward Start - Stop switch 71. Current through the forward solenoid 72 causes forward contacts 73 to close and the system runs until solenoid 72 is deenergized. The high speed solenoid is energized via the forward solenoid contact 76 and the Forward Acceleration - Deceleration switch. Contacts 7 also are held closed by solenoid 72. The load 22 will now accelerate to maximum speed in the forward direction until point c is reached. At this point the forward acceleration-deceleration switch 77 opens which de-energizes the high speed solenoid 74, and the load will decelerate to minimum speed in accordance with the characteristics of the hydraulic system. When the load reaches point b the forward start-stop switch 71 opens deenergizing the forward solenoid 72 and stopping the load at point b.

The same action occurs when the reverse command signal is given. However, the load will move from right 9.0 (point b) with high speed between 9.0 (point b) and 4.0 (point d) and stopping at point 1.0 (point a).

I claim:

1. A system for controlling the extent of movement of a movable member with respect to a fixed member and for effecting velocity changes at arbitrarily selected locations along the path of movement comprising:

means for providing a variable voltage, said variable voltage varying in direct relationship with the position of said movable member;

first means for providing a first reference voltage, said first reference voltage providing a level representative of a first arbitrarily selected location along said path of movement where a first change in velocity occurs, said first arbitraily selected location being readily changeable over a widely variable range by changing said first reference voltage;

first voltage comparison means receiving said variable voltage and said first referene voltage and generating a comparison signal when said variable voltage and said first reference voltage are substantially equal;

second means for providing a second reference voltage, said second reference voltage providing a level representative of a second arbitrarily selected location along said path of movement where a second change in velocity occurs, said second arbitrarily selected location being readily changeable over a widely variable range by changing said second reference voltage;

second voltage comparison means receiving said variable voltage and said second reference voltage, said second voltage means being responsive to said comparison signal to provide an actuation signal, said second comparison means ceasing the provision of said actuation signal when said variable voltage substantially equals said second reference voltage;

utilization means responsive to said actuation signal, said utilization means changing the velocity of movement of said movable member when said first comparison means yields said comparison signal and stopping said movement when said second comparison means ceases provision of said actuation signal;

said motion being reciprocal between preselected start and stop points and wherein said second reference voltage means establishes the stop point for motion in one direction and the start point for motion in the order direction and further including:

third means for providing a third reference voltage having a level indicative of an arbitrarily selected third position for a velocity change during motion in the opposite direction;

third voltage comparison means receiving said variable voltage and said third reference signal and generating a second comparison signal when said variable voltage and said third reference voltage are equal;

fourth means for providing a fourth reference voltage for establishing a second change in velocity at a fourth arbitrarily selected position during motion in the opposite direction;

fourth voltage comparison means receiving said variable voltage and said fourth reference voltage, said fourth voltage means being responsive to said second comparison signal to provide a second actuation signal, said fourth comparison means ceasing the provision of said second actuation signal when said variable voltage substantially equals said fourth reference voltage; and

* * * * *